United States Patent [19]

Neuenfeldt et al.

[11] 4,259,156
[45] Mar. 31, 1981

[54] DEVICE FOR COUPLING PIPELINES IN REACTOR PRESSURE VESSELS, PREFERABLY THE PIPELINES OF THE FEEDWATER MANIFOLD

[75] Inventors: Walter Neuenfeldt, Schmitten; Milan Sulic, Seulberg; Gerd Pollak, Kelsterbach, all of Fed. Rep. of Germany

[73] Assignee: Kraftwerk Union Aktiengesellschaft, Mülheim, Fed. Rep. of Germany

[21] Appl. No.: 874,897

[22] Filed: Feb. 3, 1978

[30] Foreign Application Priority Data

Feb. 7, 1977 [DE]  Fed. Rep. of Germany ....... 2705010

[51] Int. Cl.³ .............................................. G21C 3/02
[52] U.S. Cl. ....................................... 176/87; 176/65
[58] Field of Search ............................ 176/60, 65, 87

[56] References Cited

U.S. PATENT DOCUMENTS

| | | | |
|---|---|---|---|
| 2,117,752 | 5/1938 | Crosti. | |
| 3,583,429 | 6/1971 | Desmarchals | 176/87 X |
| 4,038,134 | 7/1977 | Dorner et al. | 176/87 X |
| 4,060,453 | 11/1977 | Schabert | 176/87 X |
| 4,080,257 | 3/1978 | Machado et al. | 176/87 X |
| 4,081,325 | 3/1978 | Aubert et al. | 176/87 X |
| 4,118,276 | 10/1978 | Hodzic et al. | 176/87 X |
| 4,135,974 | 1/1979 | Garkisch et al. | 176/87 X |

FOREIGN PATENT DOCUMENTS

| | | |
|---|---|---|
| 1425515 | 12/1969 | Fed. Rep. of Germany. |
| 2035869 | 10/1971 | Fed. Rep. of Germany. |
| 1115078 | 5/1968 | United Kingdom ..................... 176/87 |
| 1132091 | 10/1968 | United Kingdom ..................... 176/87 |

*Primary Examiner*—Peter A. Nelson
*Attorney, Agent, or Firm*—Herbert L. Lerner

[57] ABSTRACT

In a device for coupling pipelines in a pressure vessel of a nuclear reactor having a first piping section sealingly extending through the pressure vessel-housing wall and fastened thereto, and a second piping section sealingly connected to the first piping section, as well as a core container fastened within the pressure vessel, the core container having a cover, and steam separators forming, together with the core-container cover, a structural unit, the second piping section being also included with the core-container cover and with the steam separators fastened to the cover in the structural unit and, when the pressure vessel is opened, the second piping section together with the core-container cover being liftable out of the pressure vessel and being reinsertable into the pressure vessel, the first and the second piping sections being in mutual contact at coaxial sealing surface portion formed thereon at the sealed connecting location thereof, said sealing surface portions being placeable into a nominal location of sealing connection thereof through the weight per se of the structural unit of the core-container cover and the steam separators as well as through bracing forces for the core-container cover, the bracing forces being oriented in axial direction of the pressure vessel, and means for affording relative motion dependent upon thermal expansion, of the sealing surface portions within a predetermined tolerance range without impairing sealing action thereof.

8 Claims, 10 Drawing Figures

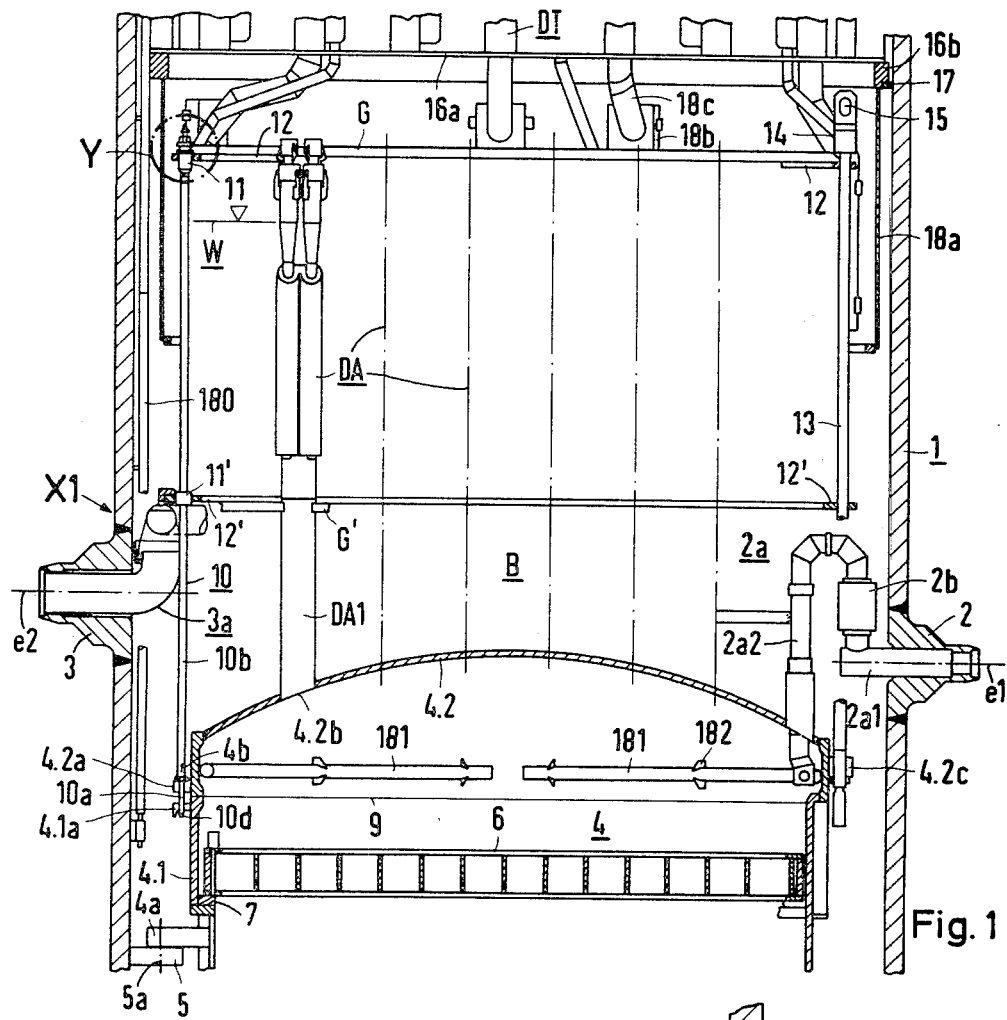
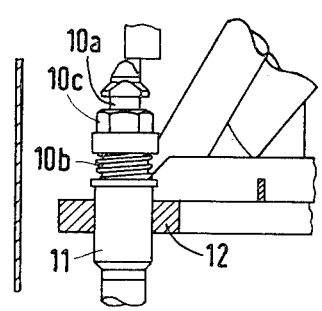
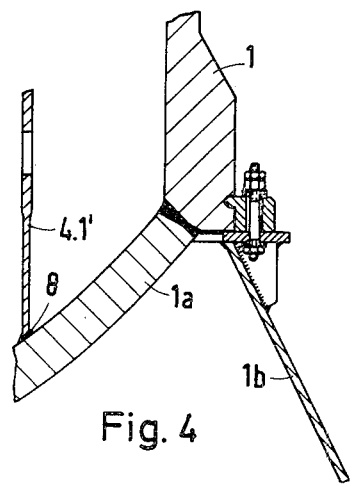
Fig. 1
Fig. 3
Fig. 4

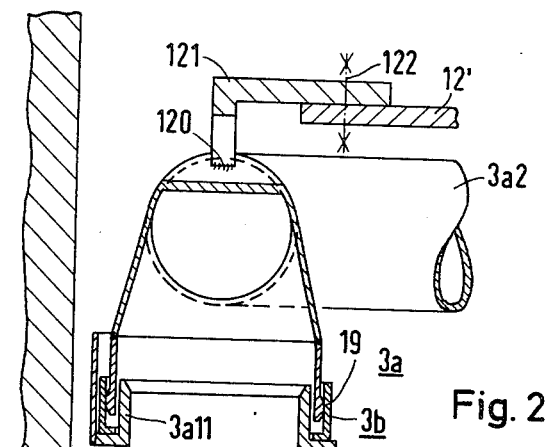
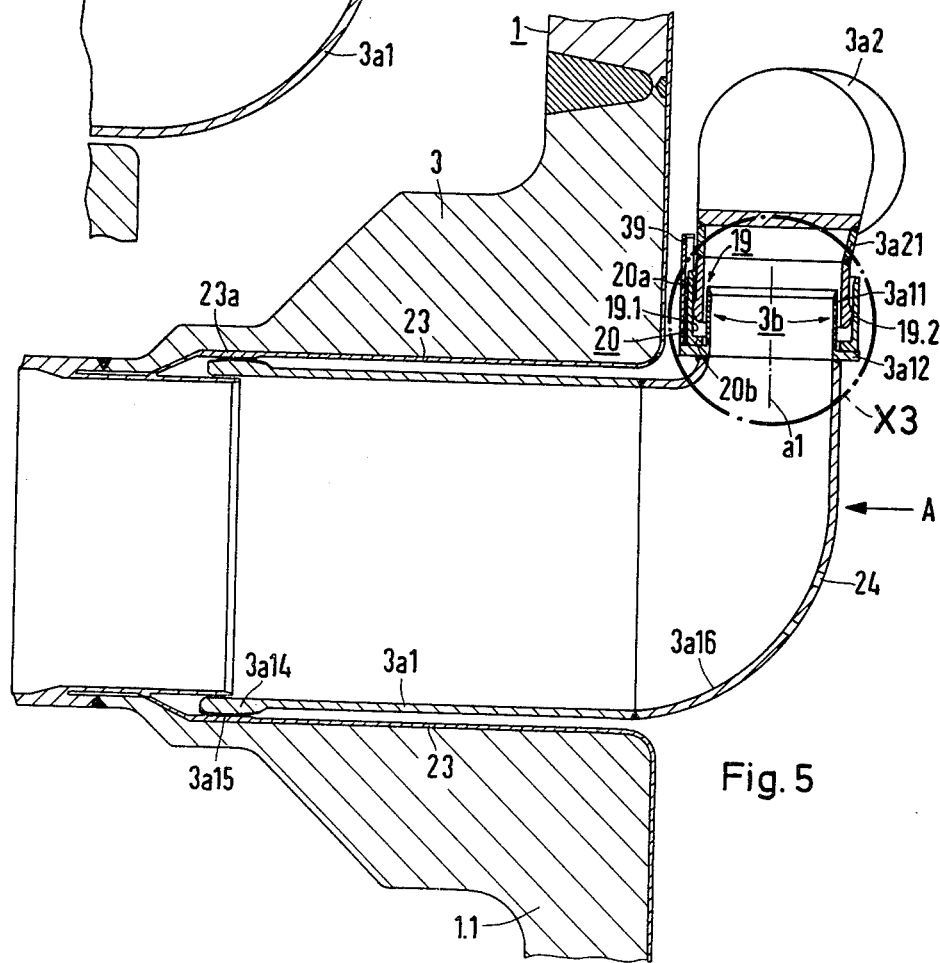

DEVICE FOR COUPLING PIPELINES IN REACTOR PRESSURE VESSELS, PREFERABLY THE PIPELINES OF THE FEEDWATER MANIFOLD

The invention relates to a device for coupling pipelines in pressure vessels of nuclear reactors, preferably the pipelines of the feedwater manifold or distributor, and which more particularly, has a first line or piping section sealingly extending through the pressure vessel-housing wall and fastened thereto, and a second line section sealingly connected to the first line section and constructed, especially, as a ring-shaped distributor line or manifold, as well as a core container with a core-container cover fastened in the pressure vessel and steam separators forming, with the core-container cover, a structural unit.

Such a device has become known heretofore, for example, from the article entitled: Steam-Water Separators and Steam Dryers, by G. Pollak in the periodical "Konstruktion", 1971, Book 11, Page 442, FIG. 1, wherein, however, no particulars are otherwise provided or recognizable details presented concerning how the connection or coupling of both line sections of the feedwater manifold is effected. Since the steam separators or cyclones are fastened to the core-container cover, a series of problems is produced: The pressure vessel and the first line section therewith, on the one hand, as well as the pressure-vessel installations (core container, cyclones) and the second line section therewith, on the other hand, exhibit varying thermal expansions, especially in axial and in radial direction, during operation, and especially for load variations as well as during start-up and shutdown. The line connection must thereby maintain the tight sealing thereof. When inserting and removing the pressure vessel-installations, a reliable and rapid coupling and uncoupling operation of both line section with a minimum of tool expense is desired. As many parts of the core-container installations as possible, also the feedwater manifold, should be removable so that an inspection of these removed parts as well as an inspection of the remaining reactor pressure vessel per se may be permitted. During operation, vibrations occur in the coolant circulatory loop of the pressure vessel; the connection or coupling of both line sections must therefore also be carried out so that it is vibration-proof.

It is accordingly an object of the invention to provide a pipeline coupling device of the foregoing type which takes the foregoing requirements into account. More specifically, it is an object of the invention to provide a coupling device for a feed-water manifold, for example, between a first and a second line section thereof, which is of such construction that it is movable by thermal inducement with good sealing action and is vibration-proof. Furthermore, in order to effect engagement or release of the coupling device, no actuation of screw or clamping closures is required.

With the foregoing and other objects in view, there is provided, in accordance with the invention, in a device for coupling pipelines in a pressure vessel of a nuclear reactor having a first line section sealingly extending through the pressure vessel-housing wall and fastened thereto, and a second line section sealingly connected to the first line section, as well as a core container fastened within the pressure vessel, the core container having a cover, and steam separators forming, together with the core-container cover, a structural unit, the second line section being also included with the core-container cover and with the steam separators fastened to the cover in the structural unit and, when the pressure vessel is opened, the second line section together with the core-container cover being liftable out of the pressure vessel and being re-insertable into the pressure vessel, the first and the second line sections being in mutual contact at coaxial sealing surface portions formed thereon at the sealed connecting location thereof, the sealing surface portions being placeable into nominal location of sealing connection thereof through the weight per se of the structural unit of the core-container cover the steam separators as well as through bracing forces for the core-container cover, the bracing forces being oriented in axial direction of the pressure vessel, and means for affording relative motion, dependent upon thermal expansion, the sealing surface portions within a predetermined tolerance range without impairing sealing action thereof.

In accordance with another feature of the invention, the coupling device includes ball-cylinder seat means forming an axial slide fit for bringing the sealing surface portions of the first and the second line sections into mutual engagement.

In accordance with a further feature of the invention, the cylinder seat of the ball-cylinder seat means comprises an angle ring having inwardly directed flanks at the underside thereof held against a support flange of an upwardly directed mouthpiece of the first line section and outwardly directed flanks surrounding coaxial sealing surface portions of the ball seat of the ball-cylinder seat means of an upwardly directed union of the second line section.

In accordance with an added feature of the invention, the angle ring has a retaining flange at the outer periphery thereof spring-elastically braced with the support flange of the mouthpiece of the first line section in a manner that relative movement in at least one of radial and tangential directions between the second line section and the angle ring with slight tilting disposition of the angle ring within the predetermined tolerance range is afforded. By the predetermined tolerance range there is meant the greatest deflections of thermally induced movement occurring during operation. As a rule, such deflections have a value of a few millimeters.

In accordance with an additional feature of the invention, the flanks at the underside of the angle ring are formed with spherical contact surfaces engaging the flange of the mouthpiece.

In accordance with yet another feature of the invention, the second line section has conically inwardly running axial guide pins and the angle ring-retaining flange is formed with corresponding guide bushings for engaging the guide pins whereby the union of the second line section is centered.

In accordance with yet a further feature of the invention, the coupling device includes a sheetmetal apron applied to the support flange of the upwardly directed mouthpiece of the first line section for shielding the angle ring-sealing surface portions from the pressure-vessel wall.

In accordance with yet an added feature of the invention, the upwardly directed mouthpiece has a tube part, and the tube part of the upwardly directed mouthpiece, the angle ring and the union of the second line section are flattened in radial direction forming a slot-like cross section.

In accordance with yet an additional feature of the invention, the coupling device includes ball-cylinder seat means forming an axial slide fit for bringing the sealing surface portions of the first and the second line sections into mutual engagement, the cylinder seat of the ball-cylinder, seat means being formed as an angle ring, the sealing surface portions of the first and the second line sections, as well as the angle ring, having outer layers of material selected from plating material and weldment material.

In accordance with a concomitant feature of the invention, there is provided a method of coupling pipelines in a pressure vessel of a nuclear reactor with the foregoing coupling device, which comprises sealingly extending the first line section through the housing wall of the pressure vessel and fastening the first line section to the housing wall; forming a structural unit within the pressure vessel of a second line section together with installations of the pressure vessel; when the pressure vessel is closed, holding the installations in position against stops disposed in the pressure vessel by means of releasable bracing means; and holding the coupling device of both the first and the second line sections in contact position thereof through a force-lock of the bracing means so that, upon releasing the bracing means and removing the installations and upon inserting the installations and arresting the bracing means, automatic uncoupling and coupling, respectively, of the coupling device are effected.

Other features which are considered as characteristic for the invention are set forth in the appended claims.

Although the invention is illustrated and described herein as embodied in a device for coupling pipelines in reactor pressure vessels, preferably the pipelines of the feedwater manifold, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary sectional view of the middle section of a nuclear reactor pressure vessel with a coupling device for a feedwater manifold according to the invention, identified generally by X1 at the left-hand side of the figure;

FIG. 2 is an enlarged view of the detail X1 shown in FIG. 1;

FIG. 3 is an enlarged fragmentary view of FIG. 1 showing the detail Y encircled by a dot-dash line;

FIG. 4 is an enlarged fragmentary sectional view of a modified form of support or bracing for the core container wherein the casing of the core container is welded to the bottom spherical shell of the pressure vessel;

FIG. 5 is an enlarged fragmentary view of FIG. 1 showing a modified embodiment of the coupling device of FIGS. 1 and 2 wherein, for the purpose of effecting a more compact construction, a first and a second pipeline section, in the region of the coupling location, are somewhat flattened in radial direction;

Figure 6:
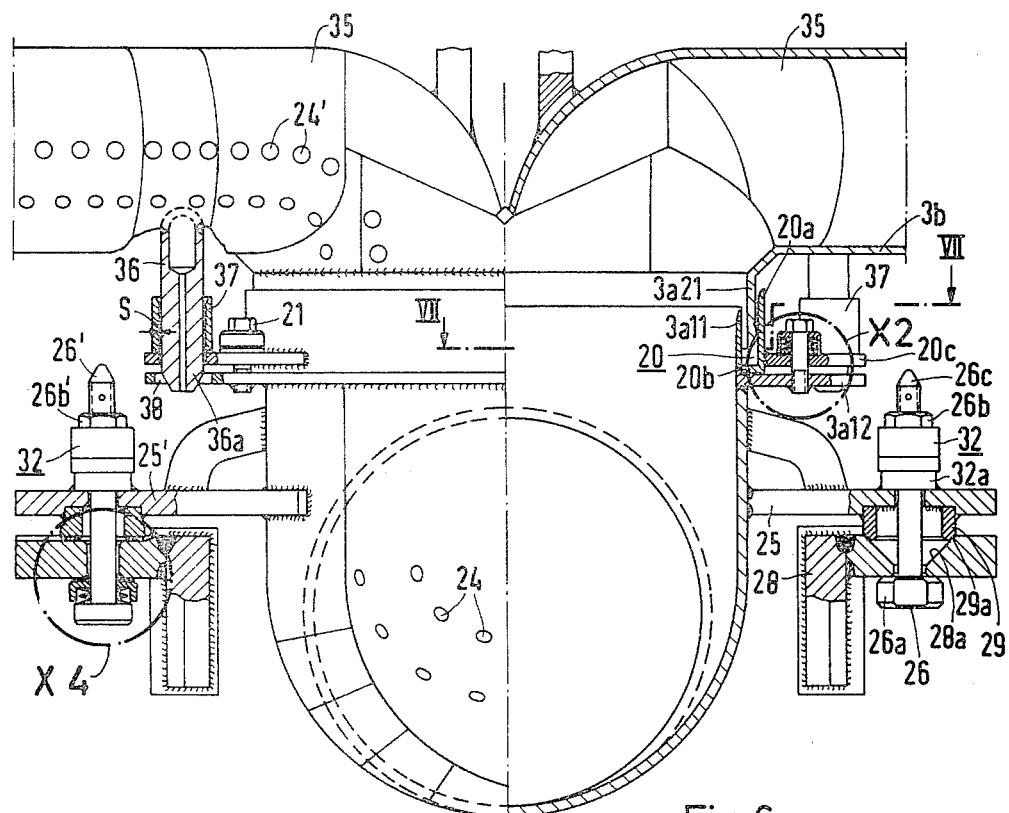
FIG. 6 is a side elevational view, partly in section, of part of the pipeline of FIG. 5 as seen in direction of the arrow A therein.
Figure 10:
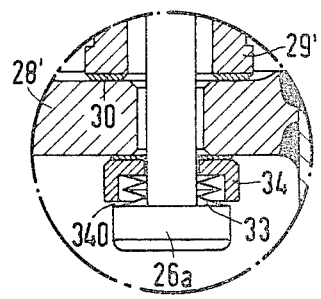
FIG. 10 is an enlarged fragmentary view of FIG. 6 showing the detail X4 encircled by a dot-dash line therein.

Referring now to the drawing and first, particularly, to FIG. 1 thereof, there is shown a pressure vessel 1 of a boiling-water nuclear reactor provided with connecting pipes or unions 2 for core flood lines 2a, and unions 3 for feedwater manifold or distributor lines 3a, the unions 2 for the core flood lines 2a being disposed in a plane e1 axially normal to i.e. normal or perpendicular to the axis of the pressure vessel, and the unions 3 for the feedwater manifold or distribution lines 3a being disposed in a plane e2 also axially normal to the pressure vessel, a multiplicity of the unions 2 and 3 and lines 2a and 3a being distributed over the periphery of the pressure vessel 1. A core container 4, also referred to as moderator container, formed of a lower part 4.1 and a cover 4.2, is mounted in the interior of the pressure vessel 1. The core container 4 is suspended by straps or claws 4a located at the outer periphery thereof, only one of which is shown in FIG. 1, from corresponding brackets 5 located at the inner periphery of the pressure vessel 1, and are threadedly secured to the brackets 5 as shown diagrammatically at 5a. An upper guide grid or perforated support plate 6 for non-illustrated fuel elements and absorption rods rests on brackets 7 of the core container 4 and is fastened thereto by non-illustrated threaded fastening devices.

In the modified embodiment of FIG. 4, the lower part 4.1 of the core container 4 is braced upon the spherical base 1a of the pressure vessel 1 and is welded thereto at 8. The pressure vessel 1 also is supported by a surrounding vertical frame 1b.

Returning to FIG. 1, an axially normal parting line 9 between the core-container cover 4.2 and the lower part 4.1 of the core container 4 is clearly shown therein. The core container 4 is clamped together by means of axial tie rods 10 (shown at the left-hand side of FIG. 1), a multiplicity of the tie rods 10 being distributed over the periphery of the core container 4. The tension or tie rods 10 engage respective brackets 4.2a and 4.1a of the cover 4.2 and the lower part 4.1 of the core container 4. The tension or tie rods 10, respectively, have a shaft 10a and a sleeve 10b and, at the upper end of the respective tie rod 10, by means of a nut 10c (FIG. 3), the shaft 10a and the sleeve 10b are stayed or braced one to the other and, thereby, the cover 4.2 is also pressed against the lower part 4.1 of the core container 4. A hammerhead 10d extends through a slot formed in the lower bracket 4.1a and grips it from behind after the hammerhead 10d is turned about 90°. For definition of the latched and unlatched position, at the location 4b, a guiding groove is provided in the sleeve 10b and a pin on the tie or tension rod shaft 10a. By means of a pair of guidance sleeves 11, 11', the tie rods 10 are guided, in the upper and middle regions thereof, to corresponding ring plates 12,12', which are firmly connected, on their part, to an array of steam separators DA, of which only one is illustrated, and to upper and lower grid support plates G and G' thereof. Risers DA1 of the steam separators DA are fitted into respective openings 4.2b formed in the cover 4.2 and are accordingly welded to the cover 4.2 at these locations.

An additional tension or tie rod 13 (at least three thereof are likewise disposed over the periphery of the core container 4) is shown in FIG. 1 and extends through the ring plates 12, 12'. The lower end of the tie rod 13 engages the cover 4.2 of the core container 4 (bracket 4.2c). The tie rod 13 is provided at the upper end thereof with a support member 14 having an eye 15 in which a hook of a non-illustrated lifting device is engageable. Above the steam separators DA, a plurality of steam dryers DT are connected by means of a support plate 16a and a support ring 16b into a single unit and are mounted on brackets 17 at the inner periphery of the pressure vessel 1. A cylindrical apron or skirt 18a is connected to the support ring 16b and is provided at the inner periphery thereof with water outlet chests 18b fastened thereto, wherein outlet pipes 18c of the steam dryer DT terminate. The water level in the pressure vessel, is indicated by the horizontal line W. One of the multiplicity of guide rods 180 fastened to the inner peripheral surface of the pressure vessel, is shown in FIG. 1. The guide rods 180 serve for axial guidance of the structural unit B when it is introduced or removed from the pressure vessel 1, the structural unit B being described more fully hereinbelow.

The core flood line 2a surrounds a first line or piping section 2a1 in the form of an otherwise non-represented thermosleeve pipe fastened in the union 2, and a second line or piping section 2a2 which is coupled at one end thereof to the first line section 2a1 through a spring-loaded thermally elastic pipe coupling 2b, and has a second end extending through the cover 4.2 of the core container 4 and connecting with a core spray ring line 181 which is, for its part, fixed to the inner peripheral surface of the core container-cover 4.2 by means of supporting or retaining dogs 182. The particular construction of this core floodline coupling 2b is not an objective of the invention of the instant application but is, indeed, the subject of co-pending Application Ser. No. 869,362 filed Jan. 13, 1977 of which the applicants of the instant application are coinventors. What is of importance with respect to the instant application, is that this coupling 2b is provided automatically without any additional auxiliary means when the structural unit B, formed of the core-container cover 4.2 and the steam separators DA is inserted therein and set into position; conversely, a loosening or release of this coupling 2b occurs also automatically without additional auxiliary equipment during removal of the structural unit B. The same basic principle is employed also for the coupling device 3b according to the invention, shown in the left-hand side of FIG. 1 as well as in FIG. 2, generally, and in detail in FIGS. 5 to 9, and indeed in a different form, because relatively little space is available in radial direction due to the disposition of the feedwater distributor or manifold line 3a. The first line section 3a1 is formed likewise of a thermosleeve pipe (FIG. 5), which extends sealingly through the union 3 and is fastened to the pressure vessel-housing wall.1.1 as is described in greater detail hereinbelow. The second line section 3a2 (only shown in part in FIGS. 1 and 2), which is constructed as a ring line, is sealingly couplable with the first line section 3a1 i.e. the upwardly directed mouthpiece 3a11. As mentioned hereinbefore, the steam separators DA and the core-container cover 4.2 together form a structural unit B. The second line section 3a2 is included in this structural unit. FIG. 2 shows the rigid or firm connection of the second line section 3a2 to the lower ring plate 12' through angle irons 121 welded at 120 and fixed by diagrammatically indicated non-unscrewable screws 122 to the ring plate 12'. The second line section 3a2 is consequently liftable together with the core container-cover 4.2 and the steam separators DA out of the pressure vessel 1, after the pressure vessel 1 has been opened for the purpose of inspection and/or maintenance, and is also reinsertable into the pressure vessel 1. In the structural unit B, there are also naturally, included the line sections 2a2 of the core floodline as well as the parts 13, 12, 12', G and G', in the embodiment of FIG. 1, further reference to which will be made in the description of the installation and removal of the structural unit B presented hereinafter. Reference is had initially to FIGS. 5 and 6 in the following, functionally like parts therein as well as in the remaining figures being identified by the same reference characters.

The first line section 3a1 and the second line section 3a2 are in engagement with one another at the coupling location 3b thereof, by means of coaxial sealing surface members identified as a whole by reference numeral 19. In the illustrated embodiment, the sealing surface members 19 form a ball-cylinder seat with spherically shaped seating surfaces 19.2 at the union 3a21 of the second line section 3a2 and with cylindrical seating surfaces 19.1 at upwardly directed flanks 20a of an angle ring 20 also having undersided, inwardly directed flanks 20b. The manner of fastening the angle ring 20 is readily apparent in FIGS. 6 and 7. In this regard, the mouthpiece 3a11 of the first line section 3a has a support flange 3a12, and the angle ring 20 has retaining flanges 20c at the outer periphery thereof. Considering FIGS. 6 and 7 together with FIG. 8, it is readily apparent that the angle ring 20 is braced by the ring flange 20c thereof spring-elastically against the flange 3a12 of the mouthpiece 3a11. This is effected by means of hex-head threaded bolts 21 which are threadedly secured in the support flange 3a12, extend through a bore 20c1 formed in the retaining flange 20c and, under prestressing of a cup or plate-spring packet 21b which is slipped over the shaft 21a and is seated between a contact washer 21d and a shell washer 21e with a mutually intervening gap 21c, pressing the angle ring 20 by the undersided flank 20b thereof. and, indeed, by spherical contact surface portions 20b1 (FIG. 9) thereof against corresponding contact surface portions 3a13 of the flange 3a12, due to force application upon the retaining flange 20c (contact surface portions 20c2).

Figure 7:
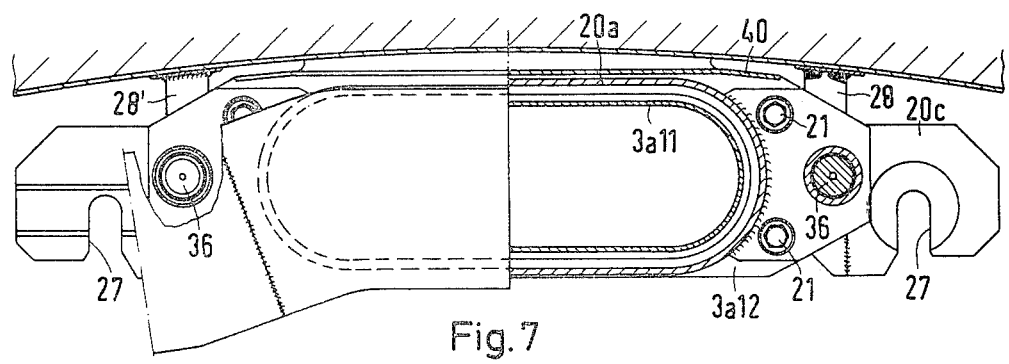
FIG. 7 is a sectional view of FIG. 6 taken along the line VII—VII in direction of the arrows.
Figure 8:
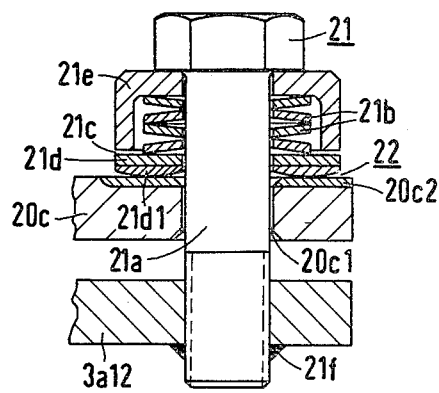
FIG. 8 is an enlarged fragmentary view of FIG. 5 showing the detail X2 encircled by a dot-dash line therein.

As is shown especially in FIGS. 5 and 7, the tube part of the upwardly extending mouthpiece 3a11 and, furthermore, the angle ring 20 and the union 3a21 of the second line section 3a2 are flattened in radial direction, considered with respect to the longitudinal axis of the pressure vessel 1, with the formation of a slot-like cross section, so that an especially compact, space-saving type of construction can be achieved. The flange 20c of the angle ring 20 is correspondingly constructed in the form of a pair of straps with a respective pair of threaded bolt pass-throughs or passageways 21 (FIG. 8). The threaded bolts 21, after adjusting for the gap 21c, are welded to the flange 3a12 (weldment 21f). The angle ring 20 constitutes a component part of the first line section 3a1. Due to the spherical contact surface portions 21d1 of the contact washer 21d and due to the gap 21c which is about 1 mm. wide, in practice, and furthermore due to the ball-cylinder seat 19.2, 20a as well as the spherical contact surface portions 20b1 which engage the opposing surface portions 2a 13 (note FIG. 9), slight tilting or tipping of the angle ring 20 with respect to the angle-ring axis a1 (FIG. 5) is afforded. This permits a tolerance equalization and elastic yielding of the angle ring 20 during introduction of the union 3a21 of the second line section 3a2. Furthermore, for varying axial, radial and tangential thermally effected movements of the first line section 3a1 and of the second line section 3a2, equalization or balance is thereby provided without having to come to compulsive forces. This is therefore significant, because the first line section 3a1 is connected to the pressure vessel 1, whereas the second line section 3a2 (note FIGS. 1 and 2) together with the steam separators DA and the core-container cover 4.2 form the structural unit B.

Figure 9:
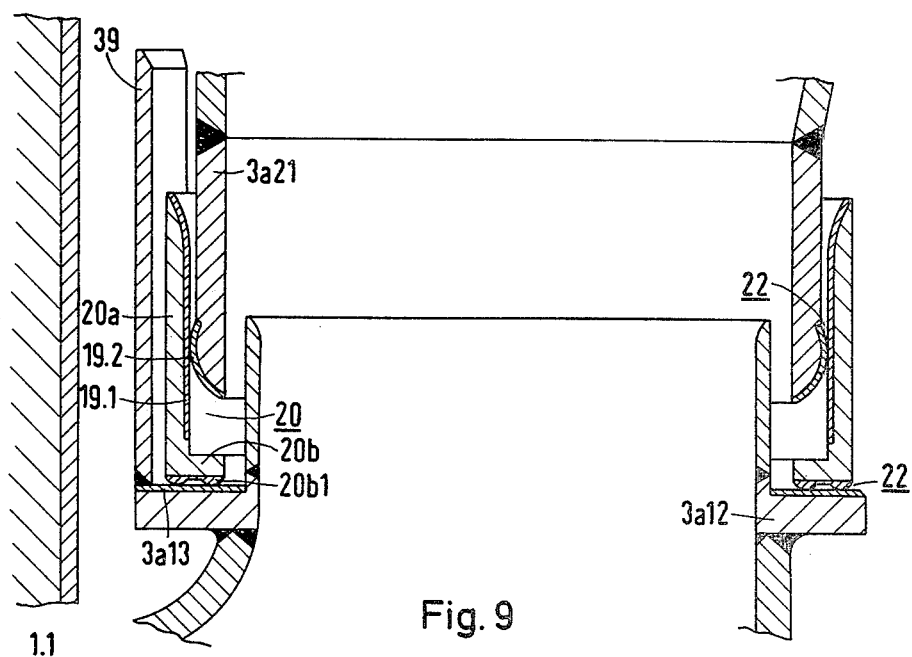
FIG. 9 is an enlarged fragmentary view of FIG. 5 showing the detail X3 encircled by a dot-dash line therein.

As is shown especially in FIG. 9, the sealing surface portions 20b1, 3a12 and 19.1 of the first line section 3a1, as well as the sealing surface portions 19.2 of the second line section 3a2 or the union 3a21 thereof, are provided with applied weldments (armor) 22 formed of a wear-resistant alloy such as are known in Germany under the trade name Stellit or UTP 7000. The same material is used as armor for the contact surface portions 21d1 and 20c2 (note FIG. 8).

The feedwater-union 3 and also the pressure vessel 1 per se (note FIG. 5) are provided at the inner peripheral surface thereof with a continuous plating 23. The first line section 3a1 initially extending radially as a thermos-leeve pipe and then upwardly and flattened out within the interior of the pressure vessel, to the mouthpiece 3a11, is provided at the outer end 3a14 thereof with spherical, likewise armored sealing surface portions 3a15 with which it engages a beefed-up or reinforced plating region 23a, so that thermally induced radial mobility is provided. In the region of the outer deflection curve 3a16, pass-through or passageway bores 24 for feedwater are provided (note also FIG. 6). The first line section 3a1, during assembly, is inserted in direction of the arrow A into the bore of the union 3, the retaining straps 25, 25' on both sides thereof, being slid with retaining bolts 26, 26' into slots 27 (FIG. 7) formed in retaining brackets 28, 28' that are welded to the inner wall of the pressure vessel 1. Between the trap 25 shown at the right-hand side of FIG. 6 and the retaining bracket 28 associated therewith, a spacer bushing or sleeve 29 welded to the strap 25 is disposed and is provided with conical seating surfaces 29a centered at a correspondingly conically shaped recess 28a formed in the retaining strap 28 (for the purpose of forming a fixed or set point of the radial and tangential thermal expansion). In the left-hand side of FIG. 4, there is clearly shown a somewhat varied spacer bushing or sleeve 29' which is welded to the respective strap 25'. At the underside thereof, the bushing 29' is formed conically only in radial direction and, contrarily, planar in tangential direction and provided with armor or reinforcement 30. The first line section 3c is thus seated with the straps 25, 25' thereof upon the brackets 28, 28' with the intermediary of the bushings or sleeves 29, 29' and is braced firmly by means of the threaded bolts 26 and contrarily, spring-elastically by means of the threaded bolts 26' with respect to these brackets 28, 28', the head 26a of the respective bolts 26, 26' gripping behind the respective brackets 28, 28' and being welded with the upper-side of the straps 25, 25', respectively, to the non-unscrewable bushings or sleeves 32 for the threaded bolts 26, 26' and the nuts 26b, 26b' thereof. In the spring-elastic bolt connection 26', a cup or plate spring 33 is inserted between the head 26a' of the bolt 26' and the bracket 28', a gap 340 ensuring thermally induced mobility between the bushing or sleeve 29' and the bracket 28' in tangential direction.

The second line section 3a2 (note especially FIG. 6) forms, outgoing from the union 3a21, a pipe branching which merges in a V-shaped manner into the two ring line sections 35. The latter are formed with corresponding injection bores 24' for the feed-water. Conically running-in axial guide pins 36 are welded to the pipe branches 35 which, during insertion and coupling of the second line section 3a2, engage in respective guide bushings or sleeves 37 of the angle ring-retainer flange 20c. This engagement serves for centering during assembly; therefore, a given clearance or play S is provided, which does not prevent thermally induced motion of the line section 3a2 within the purported tolerance range. In the vicinity of the axial guide pins 36, the ends 36a of which run in conically, as is apparent for precentering, the flange 3a12 is provided with pass-through or passageway openings 38.

Shown especially in FIGS. 5 and 9, is that, at the support flange 3a12 of the upwardly directed mouthpiece 3a11 of the first line section 3a1, a sheetmetal skirt or apron is welded, which shields the angle ring-sealing seat 19.1, 19.2 as well as 20b1, 3a13 from the pressure-vessel wall 1.1. The pressure-vessel wall 1.1 is thereby protected from possible small quantities of injected water.

Removal of the structural unit B occurs as follows:

After the steam dryers DT disposed above the structural unit B have been removed from the pressure vessel 1 (for this purpose, the pressure vessel 1 is opened beforehand and non-illustrated bracing means for the steam dryers DT have been loosened or released), and after loosening or releasing the nuts 10c and after releasing the hammerhead lock or latch 10d, the flange connection 4.2a, 4.1a can be opened and the steam separators DA together with the core-container cover 4.2 of the core floodline section 2a2 as well as of the second line section 3a1 of the feedwater distributor or manifold 3a (structural unit B) can be lifted upwardly, the tension or tie rods 13 with the support members 15 thereof serving to grip the lifting tool. The coupling 2b between the core floodline sections 2a1, 2a2, just as the coupling 3b between the first and the second line section 3a1, 3a2 are thereby released or loosened automatically, in contrast to which, during insertion or lowering of the structural unit B, again automatically attain sealing engagement. What is important for the coupling location 3b (just as for 2b), is that relative motion between the structural unit B and the first line section 3a1, which depends upon thermal expansion in axial direction and, to a slight extent, in radial and tangential directions, is permitted without impairing the sealing action. It is additionally important that the nominal location of the sealing engagement or contact in vicinity of the coupling 3b is attained through the weight per se of the structural unit B as well as through the axial bracing forces of the core container cover 4.2. The axial forces are transmitted by the core container 4 through support paws 4a thereof to brackets 5a welded to the inner peripheral surface of the pressure vessel 1 (several paws and brackets 4a, 5a are distributed over the periphery) and through the core container-bracing at 8, according to FIG. 4, to the bottom spherical wall or shell 1a of the pressure vessel.

The vibration-proof coupling location movable by thermal inducement is employable advantageously not only with the illustrated embodiments. On the contrary, it is generally employable for such pressure vessels, for example, steam generators of pressurized water nuclear reactors, wherein the first line section extends sealingly through the pressure vessel-housing wall and is fastened thereto, and wherein a second line section disposed within the pressure vessel forms, together with installed equipment of the pressure vessel, a structural unit, the installed equipment, when the pressure vessel is closed, being held in position by loosenable or releasable bracing means against stops provided in the pressure vessel, and the coupling device of both line sections being held in engagement or contact position thereof through force-locking of the bracing means, so that, when loosening or releasing the bracing means and removing the installed equipment or when inserting the equipment and arresting the bracing means, automatic uncoupling or coupling of the coupling device is effected.

There is claimed:

1. In a device for couping pipelines in a pressure vessel of a nuclear reactor having a first piping section sealingly extending through the pressure vessel-housing wall and fastened thereto, and a second piping section sealingly connected to the first piping section, as well as a core container fastened within the pressure vessel, the core container having a cover, and steam separators forming, together with the core-container cover, a structural unit, the second piping section being also included with the core-container cover and with the steam separators fastened to the cover in the structural unit and, when the pressure vessel is opened, the second piping section together with the core-container cover being liftable out of the pressure vessel and being reinsertable into the pressure vessel; the first and the second piping sections being in mutual contact at coaxial sealing surface portions formed thereon at the sealed connecting location thereof, ball-cylinder seat means forming an axial slide fit for bringing said sealing surface portions of the first and second piping sections into said mutual contact, said sealing surface portions being placeable into a nominal location of sealing connection thereof through the weight per se of the structural unit of the core-container cover and the steam separators as well as through bracing forces for the core container cover, said bracing forces being oriented in axial direction of the pressure vessel, and resilient means forafording relative motion, dependent upon thermal expansion, of said sealing surface portions within a predetermined tolerance range without impairing sealing action thereof.

2. Device according to claim 1 wherein the cylinder seat of said ball-cylinder seat means is formed as an angle ring, said sealing surface portions of the first and the second piping sections, as well as of said angle ring, having outer layers of material selected from plating material and weldment material.

3. Device according to claim 1 wherein the cylinder seat of said ball-cylinder seat means comprises an angle ring having inwardly directed flanks at the underside thereof held against a support flange of an upwardly directed mouthpiece of the first piping section and outwardly directed flanks surrounding coaxial sealing surface portions of the ball seat of said ball-cylinder seat means of an upwardly directed union of the second piping section.

4. Device according to claim 3 wherein said angle ring has a retaining flange at the outer periphery thereof spring-elastically braced with said support flange of said mouthpiece of the first piping section in a manner that relative movement in at least one of radial and tangential directions between the second piping section and said angle ring with slight tilting disposition of said angle ring within said predetermined tolerance range is afforded.

5. Device according to claim 4 wherein said flanks at the underside of said angle ring are formed with spherical contact surfaces engaging said flange of said mouthpiece.

6. Device according to claim 4 wherein the second piping section has conically inwardly running axial guidepins and said angle ring-retaining flange is formed with corresponding guide bushings for engaging said guide pins whereby said union of the second piping section is centered.

7. Device according to claim 5 including a sheetmetal apron applied to said support flange of said upwardly directed mouthpiece of the first piping section for shielding said angle ring-sealing surface portions from the pressure-vessel wall.

8. Device according to claim 7 wherein said upwardly directed mouthpiece has a tube part, and said tube part of said upwardly directed mouthpiece, said angle ring and said union of the second piping section are flattened in radial direction forming a slot-like cross section.

* * * * *